UNITED STATES PATENT OFFICE.

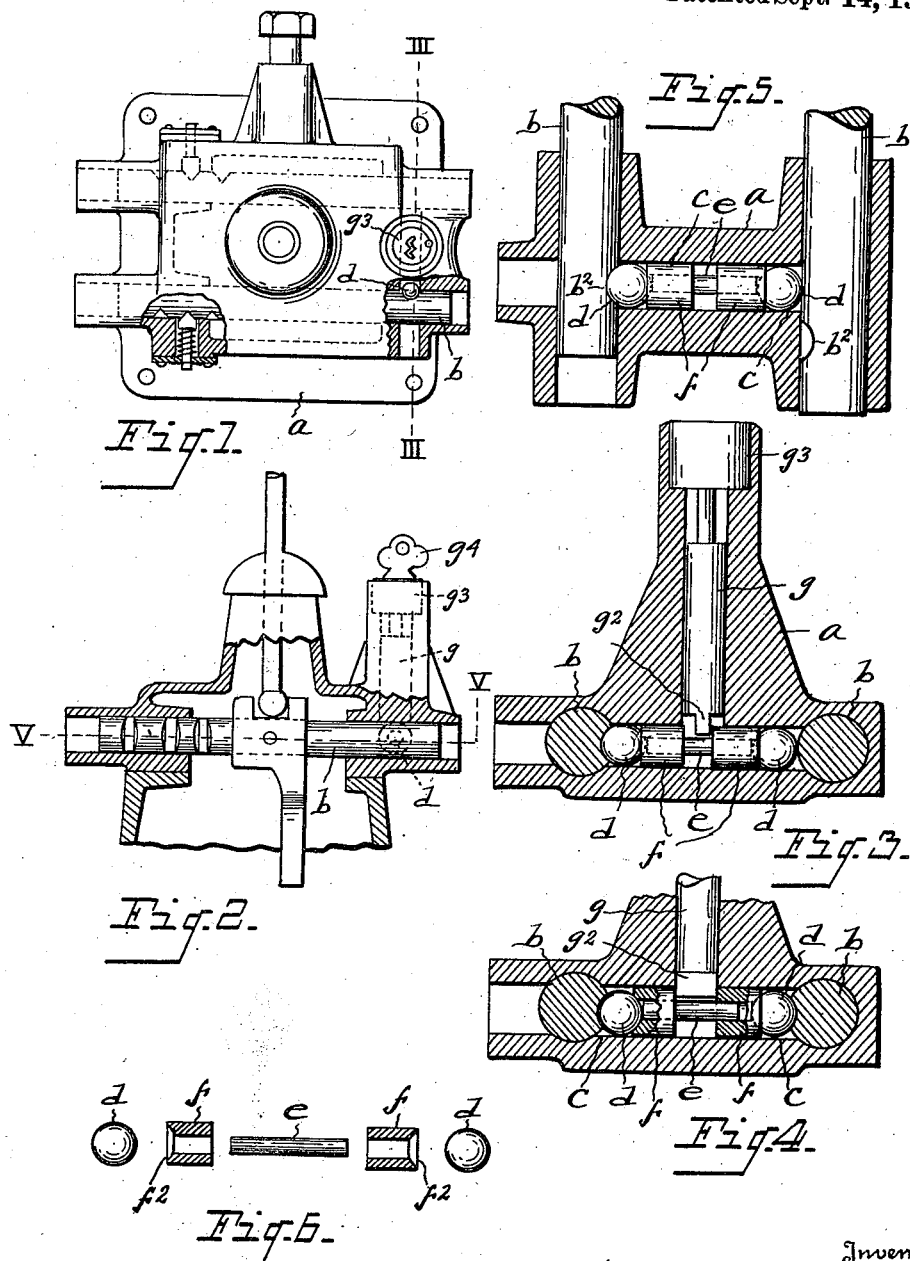

CHARLES G. TROSIEN, OF PONTIAC, MICHIGAN.

GEAR-LOCK FOR AUTOMOBILES.

1,353,120.  Specification of Letters Patent.  Patented Sept. 14, 1920.

Application filed January 26, 1920. Serial No. 354,108.

*To all whom it may concern:*

Be it known that I, CHARLES G. TROSIEN, citizen of the United States, residing at Pontiac, county of Oakland, State of Michigan, have invented a certain new and useful Improvement in Gear-Locks for Automobiles, and declare the following to be a full, clear, and exact description of the same, such as will enable others skilled in the art to which it pertains to make and use the same, reference being had to the accompanying drawings, which form a part of this specification.

My invention relates to gear locks for automobiles and an object of my improvements is to provide a strong and cheap construction which may be readily assembled and will not be liable to be broken or deteriorated in any way.

I secure this object in the device illustrated in the accompanying drawing, in which—

Figure 1 is a plan view partly in section of the cover of a change-speed gear casing, together with apparatus embodying my invention.

Fig. 2 is a side view of the same, partly broken away.

Fig. 3 is a section on the line III—III of Fig. 1, with the parts in one position.

Fig. 4 is a view similar to Fig. 3 with the parts in a different position to that shown in Fig. 3.

Fig. 5 is a detail section in the plane indicated by the line V—V, Fig. 2.

Fig. 6 is a detail view showing the parts disassembled.

$a$ is a casting forming the cover of a change-speed gearing; $b, b$ are parallel, reciprocating rods by which the constituent gears are shifted to alter the speed ratio; $c$ indicates a transverse cylindrical aperture extending, in the casting $a$, between the bearing cavities for the rods, $b, b$.

$d, d$ are balls of approximately the same diameter as the cylindrical aperture $c$ located at the ends of said aperture and adapted to reciprocate in the same. $f, f$ are sleeves fitting and adapted to reciprocate in the aperture $c$, each of said sleeves being bored longitudinally and chamfered as shown at $f^2, f^2$ at its outer end to conform to the shape of a ball $d$ to fit against said ball. $e$ is a rod fitting through the boxes of the sleeves $f, f$ and adapted to reciprocate therein. $b^2, b^2$ are cavities formed in adjacent sides of the rods $b, b$ of a shape to receive balls $d, d$ which fit accurately in said cavities. The rod $e$ is of such a length that when one of the rods $b$ is in such a position that a cavity $b^2$ in one of said rods is opposite a ball $b$ and the cavity in the other rod is removed from its position opposite its corresponding ball, the ends of the rod $e$ shall engage against the balls $d, d$ so that one of said balls is held in its corresponding cavity and that one of the rods, $b, b$ is locked while the other is free to reciprocate.

$g$ is a rotatable rod bearing in a cavity in the casting $a$ at right angles to and at the center of the cavity $c$. $g^2$ is a cam on the lower end of the rod $g$. $g^3$ indicates a pinlock apparatus at the upper end of the rod $g$. The sleeves $f, f$ are of such length that when the rod $g$ is turned to the position shown in Fig. 3, said sleeves shall be free to move to a position at which they shall not engage the balls $d, d$ but when the rod $g$ is turned at right angles to said position, that is to say to the position shown in Fig. 4, the sleeves $f, f$ are forced outward so that they engage against the balls $d, d$ which rest in the chamfered-out portion $f^2, f^2$ of said sleeves. The rod $g$ can, however, only be turned to the latter position when the cavities $b^2, b^2$ are opposite each other and the balls $d, d$ therefore engage in both of said cavities. In this position both of the rods $b, b$ are locked and the change-speed gear is in neutral position and the transmission mechanism of the automobile can not be thrown into operation.

What I claim is:

1. In an apparatus of the kind described, two shifting rods having cavities in their adjacent sides, a cavity extending between said rods, balls in the ends of said cavity, a transverse rod extending between said balls, sleeves surrounding said rod, and a locking cam to cause said sleeves to engage against said balls or to release the same.

2. In an apparatus of the kind described, two shifting rods having cavities in their adjacent sides, a cavity extending between said rods, balls in the ends of said cavity, a transverse rod extending between said balls, sleeves surrounding said rod, and a locking cam to cause said sleeves to engage against said balls or to release the same, said sleeves being chamfered at their outer ends to correspond to the surface of said balls, substantially as and for the purpose described.

In testimony whereof, I sign this specification.

CHARLES G. TROSIEN.